United States Patent
Markow et al.

(10) Patent No.: US 6,459,942 B1
(45) Date of Patent: Oct. 1, 2002

(54) ACOUSTIC COUPLING COMPENSATION FOR A SPEAKERPHONE OF A SYSTEM

(75) Inventors: Mitchell A. Markow; Jeremy Ford, both of Spring; Ji-An Gong, Houston, all of TX (US)

(73) Assignee: Compaq Information Technologies Group, L.P., Houston, TX (US)

( * ) Notice: Subject to any disclaimer, the term of this patent is extended or adjusted under 35 U.S.C. 154(b) by 0 days.

(21) Appl. No.: 08/940,928

(22) Filed: Sep. 30, 1997

(51) Int. Cl.$^7$ .............. G06F 17/00; H03G 5/00; H03H 5/00; H04M 9/00
(52) U.S. Cl. .............. 700/94; 381/98; 381/103; 333/28 R; 379/406; 379/410
(58) Field of Search .................. 381/98, 103, 59; 700/94; 333/14; 338/28 R; 379/406, 410

(56) References Cited

U.S. PATENT DOCUMENTS

| | | | |
|---|---|---|---|
| 5,533,120 A | * | 7/1996 | Staudacher ............... 381/103 |
| 5,537,654 A | * | 7/1996 | Bedingfield et al. .......... 700/40 |
| 5,617,480 A | * | 4/1997 | Ballard et al. ............... 381/98 |
| 5,848,167 A | * | 12/1998 | Werrbach .................... 381/98 |
| 5,987,145 A | * | 11/1999 | Lawton ...................... 381/103 |
| 5,991,385 A | * | 11/1999 | Dunn et al. ................. 379/420 |
| 6,009,165 A | * | 12/1999 | Karnowski .................. 379/420 |
| 6,035,046 A | * | 3/2000 | Cheng et al. ................ 381/59 |
| 6,147,797 A | * | 11/2000 | Michel et al. .............. 379/292 |

OTHER PUBLICATIONS

Christiansen, et al., "Systems and Applications," Electronic Engineers Handbook, Fourth Edition, ©1997, p. 26.112–26.113.
"Speakerphones, Voice Switched Speakerphone Circuit," Motorola Analog IC Device Data, vol. II, ©Motorola, Inc. 1996, pp. 8–25–8–30.

\* cited by examiner

Primary Examiner—Forester W. Isen
Assistant Examiner—Laura A. Grier
(74) Attorney, Agent, or Firm—Akin, Gump, Strauss, Hauer & Feld, LLP

(57) ABSTRACT

A speakerphone of a system with a digital signal processor, such as a computer, uses a filter set or network to provide acoustic coupling loss at a microphone to offset acoustic coupling gain produced by sound reflections resulting from various conditions in the system. The filter network processes an acoustic signal before the signal is provided to a digital signal processor to eliminate acoustic coupling gain that the digital signal processor is unable to cancel or offset. The filter network detects when the acoustic coupling gain in the acoustic signal at the microphone exceeds the maximum amount of acoustic coupling loss supplied by the digital signal processor. Alternatively, if acoustic coupling gain is desirable at the frequency location of the anomaly caused by the sound reflections, the filter network is used to boost the acoustic coupling gain produced by the anomaly. Thus, the present speakerphone uses equalization at the microphone to boost or attenuate acoustic coupling gain caused by frequency anomalies before acoustic echo cancellation by the digital signal processor.

32 Claims, 3 Drawing Sheets

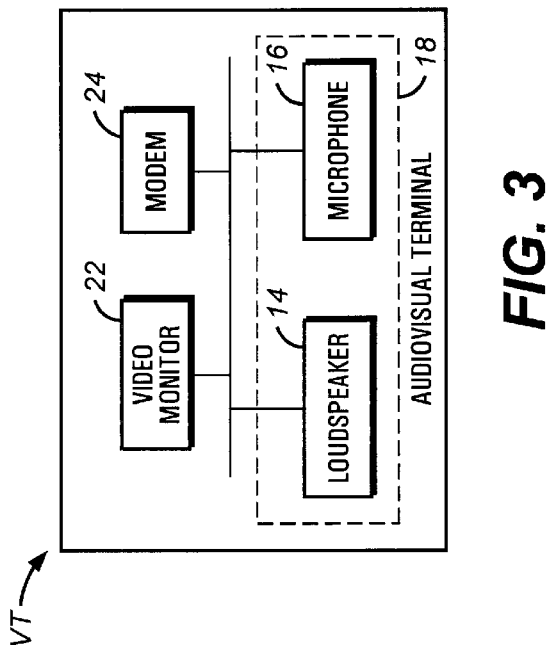
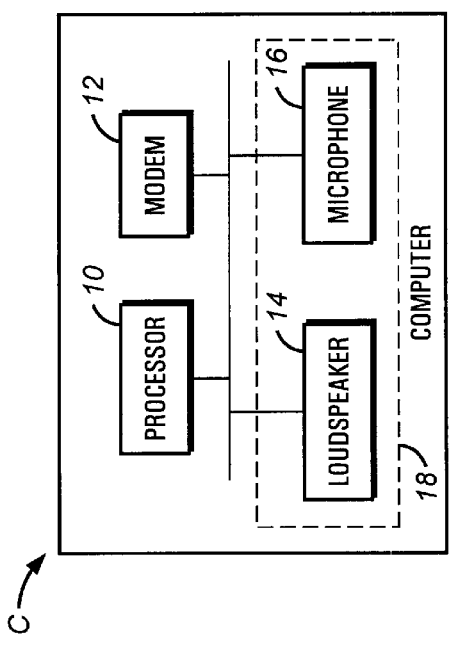
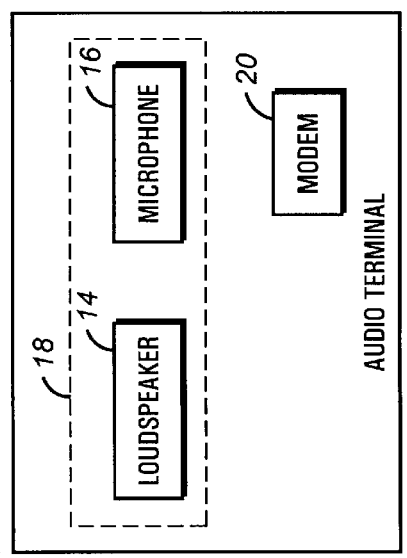
FIG. 1
FIG. 2
FIG. 3

ACOUSTIC COUPLING COMPENSATION FOR A SPEAKERPHONE OF A SYSTEM

BACKGROUND OF THE INVENTION

1. Field of the Invention

The present invention relates to a system with a digital signal processor, such as a computer, having full duplex speakerphone functionality.

2. Description of the Related Art

Systems capable of handling voice communication applications such as audio conferencing, teleconferencing, or telephony are increasingly integrating full duplex speakerphone functionality. In a full duplex speakerphone mode of a system, the speaker and microphone of a speakerphone are acoustically coupled such that sound waves from the speaker travel to the microphone. In order to prevent acoustic feedback due to sound waves traveling from the speaker to the microphone, acoustic coupling is reduced between the speaker and the microphone. This reduction is termed acoustic coupling loss. Acoustic coupling loss between a loudspeaker and a microphone of a speakerphone requires both a smooth loudspeaker frequency response and a smooth microphone frequency response.

Systems having speakerphone functionality such as certain portable computers have maintained sound reflections which degrade full duplex speakerphone performance by injecting frequency anomalies into a microphone response resulting in an irregular microphone response. For example, in a portable computer, sound reflections giving rise to frequency anomalies may result from numerous conditions such as the polar pattern of the microphone, the internal acoustic resonance of the microphone, or a near-field microphone effect. For a speakerphone user, these frequency anomalies are manifested as an unstable echo whereby the user hears his or her own voice continuously amplified. These anomalies inject acoustic coupling gain into a microphone response thereby increasing the acoustic coupling loss necessary to maintain a smooth microphone response. An acoustic echo canceler of a digital signal processor (DSP) has provided a limited amount of acoustic coupling loss to a system having sound reflections. This amount of coupling loss, however, has been insufficient to offset significant amounts of acoustic coupling gain caused by frequency anomalies.

SUMMARY OF THE INVENTION

Briefly, according to the present invention, a speakerphone uses a filter set or network to provide acoustic coupling loss at a microphone to offset acoustic coupling gain produced by sound reflections resulting from various conditions in a system. The filter network pre-processes an acoustic signal before the signal is provided to a digital signal processor to sufficiently eliminate acoustic coupling gain which the digital signal processor is unable to cancel or offset. The filter network is used to detect when the acoustic coupling gain in the acoustic signal at the microphone exceeds the maximum amount of acoustic coupling loss supplied by the digital signal processor. Alternatively, if acoustic coupling gain is desirable at the frequency location of the anomaly caused by the sound reflections, the filter network is used to boost the acoustic coupling gain produced by the anomaly. Thus, the present invention uses equalization at the microphone to boost or attenuate acoustic coupling gain caused by frequency anomalies before acoustic echo cancellation by the digital signal processor.

BRIEF DESCRIPTION OF THE DRAWINGS

A better understanding of the present invention can be obtained when the following detailed description of the preferred embodiment is considered in conjunction with the following drawings, in which:

FIG. 1 is a schematic diagram of a computer embodiment including a speakerphone of the present invention;

FIG. 2 is a schematic diagram of an audio terminal embodiment including a speakerphone of the present invention;

FIG. 3 is a schematic diagram of an audiovisual terminal embodiment including a speakerphone of the present invention;

DETAILED DESCRIPTION OF THE PREFERRED EMBODIMENT

Figure 4:
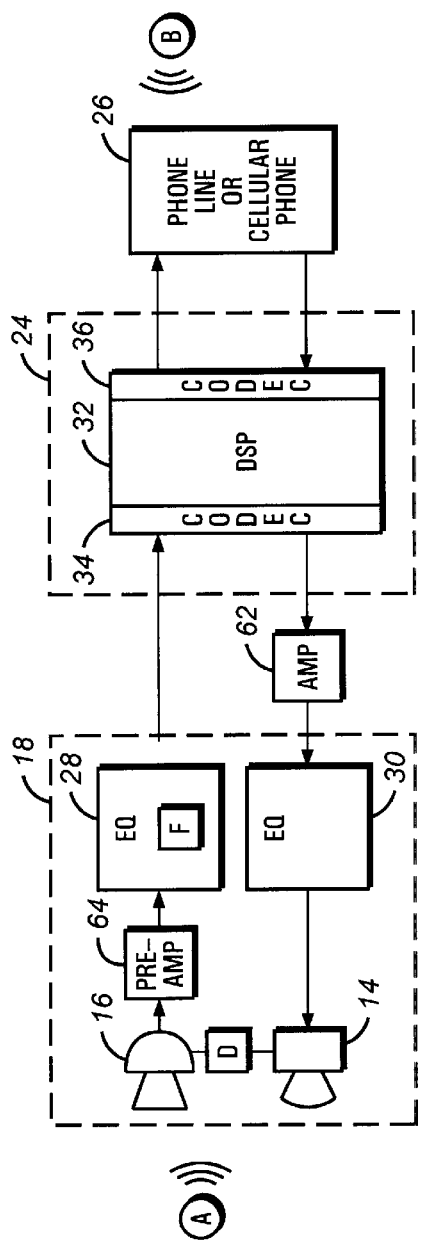
FIG. 4 is a schematic diagram illustrating a modem, a digital signal processor, a phone line, and the speakerphone and filter network of the present invention.

Turning now to the drawings, a schematic diagram of a computer system C is shown in FIG. 1. The computer system C includes a processor 10, a modem 12, a loudspeaker 14, and a microphone 16. Loudspeaker 14 and the microphone 16 form the speakerphone 18 of the present invention. The speakerphone 18 preferably operates with a phone line or a cellular phone 26. The computer system C may be a personal computer (PC) or a network computer (NC). In addition, the processor 10 may be an embedded microcontroller or a central processing unit. If the user desires to place the system C in a speakerphone mode, the user initiates a speakerphone software application or the like allowing the processor 10 to activate the speakerphone 18. Also, it should be understood that the computer system C preferably includes audiovisual hardware allowing for multimedia presentation.

The modem 12 is preferably a data/fax modem having PCMCIA (Personal Computer Memory Card International Association), ISDN (Integrated Services Digital Network), and internet capabilities. It should be understood that the modem 12 may be of any type; therefore, the modem 12 may be an external modem, a PC Card modem, or an integrated modem.

Further, the computer system C preferably includes video conferencing software for use with the modem 12. Additionally, the computer system C may be a portable, a desktop, or other type of computer. Certain devices present in a typical computer but not involved in the operation of the present invention are not shown in order to simplify the drawings.

Referring to FIG. 2, a block diagram of an audio terminal AT is shown. The audio terminal AT includes a loudspeaker 14, a microphone 16, and a modem 20. Modem 20 in the audio terminal AT differs from modem 12 in the computer C to the extent that certain features of modem 12 such as PCMCIA card 5 are not needed in modem 20. Loudspeaker 14 and microphone 16 of the audio terminal AT form the speakerphone 18 of the present invention. An audio terminal AT is a device having speakerphone functionality used for sending or receiving acoustic signals. An example of an audio terminal AT is a speakerphone itself.

Referring to FIG. 3, a schematic diagram of an audiovisual terminal VT is shown. The audiovisual terminal VT includes a video monitor 22, a modem 24, a loudspeaker 14, and a microphone 16. The modem 24 in the audiovisual terminal VT differs from the modem 12 in the computer C to the extent that certain features of modem 12 such as PCMCIA cards are not needed in modem 24. The loudspeaker 14 and the microphone 16 of audiovisual terminal VT form the speakerphone 18 of the present invention. An audiovisual terminal VT is a device having speakerphone functionality for sending or receiving acoustic signals and a screen or monitor 22 for displaying video signals. Both videophones and internet terminals are examples of audiovisual terminals. It should be understood that the computer embodiment C, audio terminal embodiment AT, and audiovisual terminal embodiment VT are exemplary embodiments, as the speakerphone 18 of the present invention may be used in other embodiments.

In a full duplex speakerphone mode of a system, the speaker 14 and microphone 16 of a speakerphone 18 are acoustically coupled such that sound waves from the microphone 16 travel to the speaker 14. In order to prevent acoustic feedback due to sound waves traveling from the speaker 14 to the microphone 16, acoustic coupling is reduced between the speaker 14 and the microphone 16. This reduction is termed acoustic coupling loss. Acoustic coupling loss between a loudspeaker 14 and a microphone 16 of a speakerphone 18 requires both a smooth loudspeaker frequency response and a smooth microphone frequency response.

Systems having speakerphone functionality such as certain portable computers have maintained sound reflections which degrade full duplex speakerphone performance by injecting frequency anomalies into a microphone response resulting in a rough microphone response. For example, in a portable computer, sound reflection giving rise to frequency anomalies may result from numerous conditions such as the polar pattern of the microphone 16, the internal acoustic resonance of the microphone 16, or a near field microphone effect. For a speakerphone user, these frequency anomalies are manifested as an unstable echo. With such an echo, the user hears his or her own voice continuously amplified. A rough microphone response resulting from such anomalies injects acoustic coupling gain into a microphone response, thereby increasing the acoustic coupling loss necessary to maintain a smooth microphone response.

The modem 24 of a speakerphone 18 includes a digital signal processor (DSP) 32 having an acoustic echo canceler 38. An acoustic echo canceler is a specialized equalizer for performing multipath correction to prevent multipath components that give rise to acoustic echoes. An acoustic echo canceler 38 of DSP 32 has provided a limited amount of acoustic coupling loss to a system having sound reflections (FIG. 4). This amount, however, has been insufficient to offset significant amounts of acoustic coupling gain caused by the frequency anomalies.

Referring to FIG. 4, a schematic diagram illustrating an audio capable system, such as a computer, including a modem 24, a DSP 32, a phone line or cellular phone 26, and a speakerphone 18 of the present invention is shown. The speakerphone 18 includes the microphone 16 and a pre-amplifier 64 for amplifying the signal from the microphone 16 before the signal is processed to improve the signal to noise ratio of the signal. The speakerphone 18 also includes a set of equalizers 28 coupled to the pre-amplifier 64, the loudspeaker 14, and a set of equalizers 30 coupled to the loudspeaker 14. A conventional set of equalizers such as the set 30 coupled to the loudspeaker 14 typically includes equalizers for merely synthesizing acoustic signals to improve sound quality. Contrastingly, the set of equalizers 28 of the present invention includes a filter set or network F for providing acoustic coupling loss at the microphone 16 to offset acoustic coupling gain produced by sound reflections in the system.

From the set of equalizers 28 of the present invention, an acoustic signal is provided to the DSP 32 of the modem 24. The DSP 32 includes a coder-decoder (CODEC) or A/D and D/A converter 34 which samples and digitizes the analog acoustic signal. The DSP 32 provides acoustic coupling loss to an acoustic signal to offset acoustic coupling gain introduced into a signal. Since the DSP 32 provides a limited amount of acoustic coupling loss, the filter network F of the present invention which receives the acoustic signal before the DSP 32, provides an amount of acoustic coupling loss which sufficiently attenuates the signal for the DSP 32.

The CODEC 36 of the DSP 32 then converts the attenuated acoustic signal from digital to analog form, and the signal is sent over a phone line or through a cellular phone 26. Communication through the cellular phone 26 may be by satellite. The CODEC 36 also receives and converts an acoustic signal from the phone line or cellular phone 26 and converts the signal from analog to digital form. The CODEC 36 then passes the signal to the DSP 32, which processes the signal and converts the signal back to analog by the CODEC 34. The CODEC 34 provides the acoustic signal to the set of equalizers 30 and loudspeaker 14. Preferably, an amplifier 62 is provided between the CODEC 34 and the set of equalizers 30 for amplifying the acoustic signal before it is sent to the loudspeaker 14.

Figure 5:
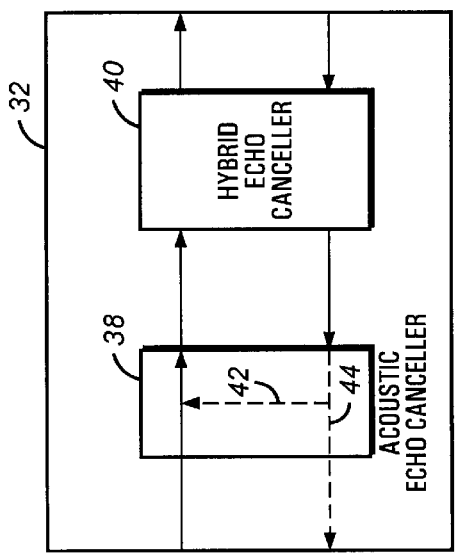
FIG. 5 is a schematic diagram of the digital signal processor of FIG. 4.

Referring to FIG. 5, a schematic diagram of the DSP 32 is shown. The DSP 32 includes an acoustic echo canceler 38 and a hybrid echo canceler 40. The hybrid echo canceler 40 is used to cancel an echo of a speakerphone user's voice which is generated when the user's voice is sent over a phone line 26 and returns from that phone line 26 to the speakerphone user. Such an echo may be the result of a malfunctioning hybrid echo canceler in the modem 24 of the speakerphone user or the modem of the party on the other side of the phone line 26.

An acoustic echo canceler 38 is used in a full duplex speakerphone mode to prevent acoustic echoes by injecting acoustic coupling loss into an acoustic signal. The acoustic echo canceler 38 both sends a wavetrace of an acoustic signal to a microphone 16 as illustrated by path 42 and processes and sends an acoustic signal to the loudspeaker 14 as illustrated by path 44. A voice source shown schematically at A (FIG. 4) represents a party using the speakerphone of the present invention, and a voice source schematically shown at B represents a party on the other end of the phone line (FIG. 4). Since the loudspeaker 14 and the microphone 16 are acoustically coupled, the voice generated by voice source B and sent to the loudspeaker 14 travels to the microphone 16. When the voice generated by voice source B from the microphone 16 reaches the acoustic echo canceler 38, the canceler 38 compares the acoustic signal generated by voice source B, driving the loudspeaker and the acoustic signal generated by voice source A through the microphone. The canceler 38 then cancels or attenuates acoustic coupling gain in the acoustic signal corresponding to voice source B to prevent acoustic echoes.

A problem has arisen when the acoustic signal includes more acoustic coupling gain than the canceler 38 can attenuate. This problem is resolved by using the filter network F of the present invention to attenuate a sufficient amount of the acoustic coupling gain before the acoustic signal is sent to the acoustic echo canceler 38 of the DSP 32.

Figure 6:
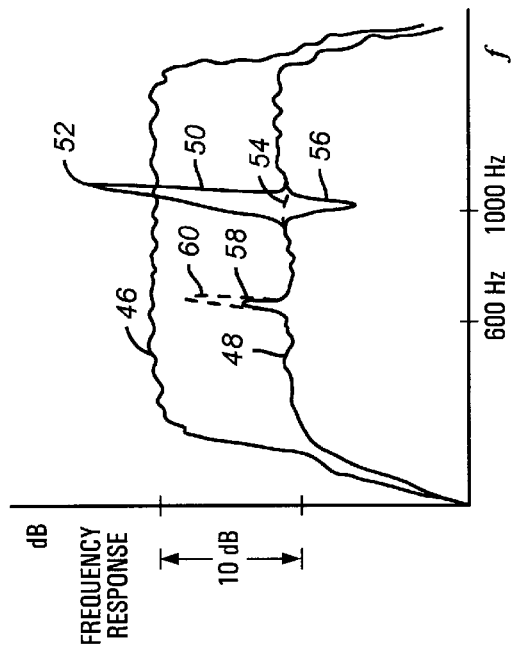
FIG. 6 is a frequency spectrum response graph illustrating a loudspeaker response and a microphone response for the speakerphone of FIG. 4.

Referring to FIG. 6, a graph illustrating the loudspeaker response and microphone response for the speakerphone 18 is shown. The loudspeaker response waveform 46 represents the response of the loudspeaker 14. The microphone response waveform 48 represents the response of the microphone 16. The difference between the illustrated linear or smooth portions of the waveforms 46 and 48 is 10 dB. A typical acoustic echo canceler 38 has been capable of providing acoustic coupling loss to offset a 10 dB difference. It should be understood that the dB range which an acoustic echo canceler 38 of a DSP 32 can attenuate may vary.

As described above, frequency anomalies have occurred at certain frequencies due to sound reflections in a system. Such anomalies inject acoustic coupling gain into a microphone frequency response. An exemplary anomaly 50 with a peak 52 injecting acoustic coupling gain into the microphone response waveform 48 occurs at about 1000 Hz. The anomaly peak 52 is several dB higher than a desired level 54 comparable to the smooth response level 48. When the difference between the peak 52 of the anomaly 50 and the desired level 54 of the microphone response waveform 48 is greater than 10 dB, the acoustic echo canceler 38 is unable to provide sufficient acoustic coupling loss.

With the present invention, the acoustic coupling loss needed is supplied by the filter network F before the acoustic signal is sent to the echo canceler 38 of the DSP 32. It should be noted that the filter network F is present in the microphone equalization circuit 28 and not the speaker equalization circuit 30. If the acoustic coupling loss were supplied in the speaker equalizer circuit 30, the resultant signal would be distorted and would thereby disrupt the acoustic performance of the speaker 14.

The filter network F of the present invention, like the acoustic echo canceler 38, is adaptive such that the filter adjusts for dynamic changes of the acoustic environment. In this way, appropriate amounts of acoustic coupling loss or gain reduction are continuously supplied by the filter network F to smooth or flatten out the microphone signal to a level such as shown at 54 so it may be processed by the DSP 32. The filter network F consists of various filters within the voice band, which is typically the frequency range between 300 Hz and 3 or 4 kHz. It should be understood that the filters could be designed to accommodate different frequency ranges, should operation in such ranges be desirable.

Figure 8:
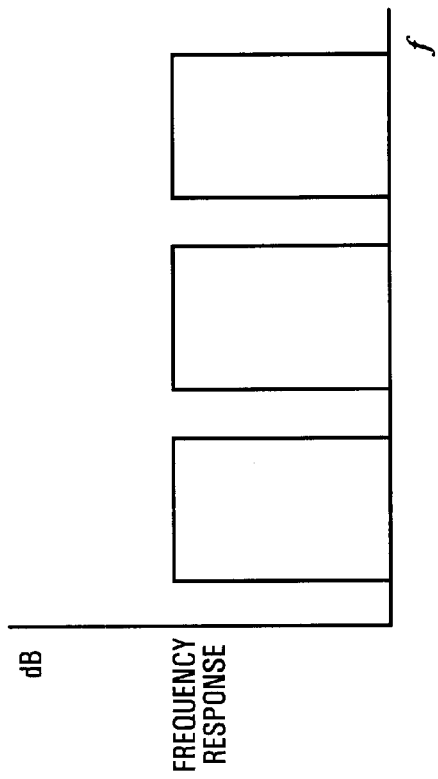
FIG. 8 is a frequency spectrum response graph illustrating a frequency response for the filter network of FIG. 4, the network including three band pass filters.
Figure 7:
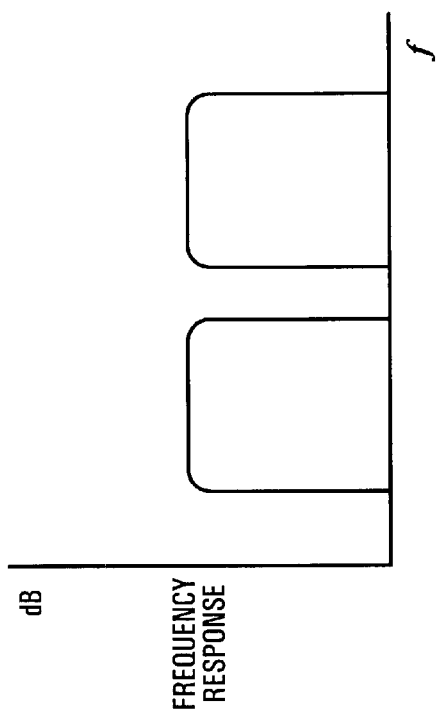
FIG. 7 is a frequency spectrum response graph illustrating a frequency response for the filter network of FIG. 4, the network including two band pass filters.

In one embodiment of the filter network F, two band-pass filters are arranged to pass different frequency ranges spaced from each other adjacent a frequency where an anomaly is known or expected to exist. The spectra of the two filters are selected to create an overall frequency response which resembles a notch filter as shown in FIG. 7. The design and operation of band-pass and notch filters to achieve specified performance parameters such as gain level, bandwidth, center frequency, upper and low cutoff frequencies and the like, are well-known in the art. It should be understood that the filter network F of the present invention could include filters of different frequency characteristics, such as low-pass filters, high-pass filters, band-step filters, or other filter designs depending on the nature of the frequency anomalies problem. Further, it should be understood that the filter network may include additional notches at frequencies where anomalies are expected or encountered if necessary to address multiple frequency anomalies. This can be done by using three band-pass filters with spectra separated at the particular problem frequencies to achieve a two notch frequency response as shown in FIG. 8.

The filter network F inserts a dip or notch of sufficient bandwidth to envelop the anomaly into the microphone response waveform 48 at the frequency location of the anomaly. The inserted notch is preferably the inverse of a portion of the frequency response produced by the anomaly. The notch partially corrects the microphone response waveform 48 so that the partially corrected microphone response waveform 48 is within a decibel range of the desired amplitude level 54 for the microphone response waveform 48 that the canceler 38 is capable of attenuating. An exemplary decibel range of 10 dB is shown in FIG. 6. When the microphone response waveform 48 is within a decibel range that the canceler 38 itself is capable of attenuating, the acoustic echo canceler 38 itself cancels the acoustic coupling gain due to the anomaly, producing a fully corrected microphone response waveform 48.

Alternatively, if a frequency anomaly occurs at a frequency where acoustic coupling gain is desirable, the filter network F may be used to boost the gain at the frequency of the anomaly. For example, for an acoustic coupling gain which is desirable at 600 Hz, a frequency anomaly 58 has either occurred or is expected at that frequency as illustrated in FIG. 6. Rather than attenuating the anomaly 58, the filter network F is used to boost the gain at the frequency of that anomaly by inserting a peak 60 in the microphone response waveform 48. This boost in gain brings the microphone response waveform 48 to a desired amplitude level.

Thus, the filter network F of the present invention pre-processes acoustic signals for an acoustic echo canceler 38 of a DSP 32 by providing acoustic coupling, thereby preventing acoustic echoes which commonly are heard when a speakerphone 18 of a system such as a computer is used in a full duplex mode.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

What is claimed is:

1. A computer system having a microphone providing acoustic coupling to correct for frequency response anomalies in acoustic signals and produce a smooth microphone frequency response, the frequency response anomalies having a first portion and a second portion, comprising:

a speakerphone, comprising:
  a loudspeaker transmitting acoustic signals;
  a microphone receiving acoustic signals from said loudspeaker; and
  an equalization system coupled to said microphone providing acoustic coupling to partially equalize the acoustic signals by correcting the first portion of the frequency response anomalies, said microphone passing the partially equalized acoustic signals to a digital signal processor;
a digital signal processor receiving the partially equalized acoustic signals from said microphone and providing acoustic coupling to fully equalize the partially equalized acoustic signals by correcting the second portion of the frequency response anomalies to produce a smooth microphone response; and a system processor activating said speakerphone to place the computer system in a speakerphone mode.

2. The computer system of claim 1, wherein said equalization system comprises a filter network for providing acoustic coupling loss to partially equalize the acoustic signals by correcting the first portion of the frequency response anomalies.

3. The computer system of claim 2, wherein said filter network comprises a band-pass filter.

4. The computer system of claim 2, wherein said filter network comprises a low-pass filter.

5. The computer system of claim 2, wherein said filter network comprises a high-pass filter.

6. The computer system of claim 2, wherein said filter network comprises a notch filter.

7. The computer system of claim 1, wherein said equalization system comprises a filter network for providing acoustic coupling gain to boost the frequency response anomalies producing a desired microphone response.

8. The computer system of claim 1, wherein the sum of the acoustic coupling provided to correct said first portion and the acoustic coupling provided to correct said second portion exceeds the maximum amount of acoustic coupling provided by said digital signal processor.

9. The computer system of claim 1, wherein said digital signal processor is integrated into a modem.

10. An audio capable system having a microphone providing acoustic coupling to correct frequency response anomalies in acoustic signals and produce a smooth microphone response, the frequency response anomalies having a first portion and a second portion, comprising:
   a speakerphone, comprising:
      a loudspeaker transmitting acoustic signals; and
      a microphone receiving acoustic signals from said loudspeaker; and
      an equalization system coupled to said microphone providing acoustic coupling to partially equalize the acoustic signals correcting the first portion of the frequency response anomalies, said microphone passing the partially equalized acoustic signals to a digital signal processor; and
   a digital signal processor receiving the partially equalized acoustic signals from said microphone and providing acoustic coupling to fully equalize the partially equalized acoustic signals by correcting the second portion of the frequency response anomalies to produce a smooth microphone response.

11. The system of claim 10, wherein said equalization system comprises a filter network for providing acoustic coupling loss to partially equalize the acoustic signals by correcting the first portion of the frequency response anomalies.

12. The system of claim 11, wherein said filter network comprises a low-pass filter.

13. The system of claim 11, wherein said filter network comprises a high-pass filter.

14. The system of claim 11, wherein said filter network comprises a notch filter.

15. The system of claim 10, wherein said equalization system comprises a filter network for providing acoustic coupling gain to boost the frequency response anomalies to produce a desired microphone response.

16. The system of claim 10, wherein the sum of the acoustic coupling provided to correct said first portion and said acoustic coupling provided to correct the second portion exceeds the maximum amount of acoustic coupling provided by said digital signal processor.

17. The system of claim 10, wherein said digital signal processor is integrated into a modem.

18. A speakerphone system having a microphone providing acoustic coupling to correct for frequency response anomalies in acoustic signals, the frequency response anomalies having a first portion and a second portion, comprising:
   a loudspeaker transmitting acoustic signals;
   a microphone receiving acoustic signals from said loudspeaker; and
   an equalization system coupled to said microphone providing acoustic coupling to partially equalize the acoustic signals by correcting the first portion of the frequency response anomalies, said microphone passing the partially equalized acoustic signals to a digital signal processor,
   wherein a digital signal processor receives the partially equalized acoustic signals from said microphone and provides acoustic coupling to fully equalize the partially equalized acoustic signals by correcting the second portion of the frequency response anomalies to produce a smooth microphone response.

19. The speakerphone of claim 18, wherein said equalization system comprises a filter network for providing acoustic coupling loss to partially equalize the acoustic signals by correcting the first portion of the frequency response anomalies.

20. The speakerphone of claim 19, wherein said filter network comprises a band-pass filter.

21. The speakerphone of claim 19, wherein said filter network comprises a low-pass filter.

22. The speakerphone of claim 19, wherein said filter network comprises a high-pass filter.

23. The speakerphone of claim 19, wherein said filter network comprises a notch filter.

24. The speakerphone of claim 18, wherein said equalization system comprises a filter network for providing acoustic coupling gain to boost the frequency response anomalies to produce a desired microphone response.

25. A method of preprocessing acoustic signals having frequency response anomalies, the acoustic signals to be equalized by a digital signal processor of a speakerphone of an audio capable system, the frequency response anomalies including a first portion and a second portion, comprising the steps of:
   detecting when the amount of acoustic coupling for correcting the frequency response anomalies is greater than the maximum amount of acoustic coupling provided by a digital signal processor; and
   providing acoustic coupling at the microphone to partially equalize the acoustic signals by correcting the first portion of the frequency response anomalies such that the amount of acoustic coupling for correcting the second portion is less than the maximum amount of acoustic coupling provided by the digital signal processor.

26. A method of preprocessing acoustic signals having response frequency anomalies, the acoustic signals to be equalized by a digital signal processor of a speakerphone of an audio capable system, the frequency response anomalies including a first portion and a second portion, comprising the steps of:
   detecting when the amount of acoustic coupling for correcting the frequency response anomalies is greater than the maximum amount of acoustic coupling provided by a digital signal processor; and providing acoustic coupling at the microphone to partially equalize the acoustic signals by correcting the first portion of the frequency response anomalies such that the amount of acoustic coupling for correcting the second portion is less than the maximum amount of acoustic coupling provided by the digital signal processor.

27. The method of claim 26, wherein said step of providing acoustic coupling at a microphone to partially equalize the acoustic signals comprises the step of providing acoustic coupling loss to attenuate the first portion of the frequency response anomalies.

28. The method of claim 26, wherein said step of providing acoustic coupling at a microphone to partially equalize the acoustic signals comprises the step of providing acoustic coupling gain to boost the first portion of the frequency response anomalies.

29. A method of equalizing acoustic signals having frequency response anomalies by correcting the frequency response anomalies to produce a smooth microphone response, the frequency response anomalies having a first portion and a second portion, comprising the steps of:

providing acoustic coupling to acoustic signals at a microphone to correct the first portion of the frequency response anomalies; and providing acoustic coupling to acoustic signals at a digital signal processor to correct the second portion of the frequency response anomalies to produce a smooth microphone response.

30. The method of claim 29, wherein said step of providing acoustic coupling to acoustic signals at a microphone comprises the step of providing acoustic coupling loss to attenuate the first portion of the frequency response anomalies.

31. The method of claim 29, wherein said step of providing acoustic coupling at a microphone comprises the step of providing acoustic coupling gain to boost the first portion of the frequency response anomalies.

32. The method of claim 29, wherein the sum of the acoustic coupling provided to correct said first portion and the acoustic coupling provided to correct said second portion exceeds the maximum amount of acoustic coupling provided by the digital signal processor.

* * * * *